US009399804B2

(12) United States Patent
Ozaki et al.

(10) Patent No.: US 9,399,804 B2
(45) Date of Patent: Jul. 26, 2016

(54) METHOD FOR RECOVERING SCANDIUM (71) Applicant: SUMITOMO METAL MINING CO., LTD., Tokyo (JP)

(72) Inventors: Yoshitomo Ozaki, Niihama (JP); Toshihiko Nagakura, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/437,767

(22) PCT Filed: Apr. 25, 2014

(86) PCT No.: PCT/JP2014/061783
§ 371 (c)(1),
(2) Date: Apr. 22, 2015

(87) PCT Pub. No.: WO2014/181721
PCT Pub. Date: Nov. 13, 2014

(65) Prior Publication Data
US 2016/0047014 A1    Feb. 18, 2016

(30) Foreign Application Priority Data

May 10, 2013   (JP) .................................. 2013-100217

(51) Int. Cl.
*C22B 59/00*   (2006.01)
*C22B 3/08*    (2006.01)
(Continued)

(52) U.S. Cl.
CPC ............... *C22B 59/00* (2013.01); *C22B 3/0005* (2013.01); *C22B 3/08* (2013.01); *C22B 3/22* (2013.01); *C22B 3/42* (2013.01); *C22B 3/44* (2013.01); *C22B 23/043* (2013.01); *Y02P 10/234* (2015.11)

(58) Field of Classification Search
CPC ............ C22B 59/00; C22B 3/08; C22B 3/42; C22B 7/007; C22B 23/043
See application file for complete search history.

(56) References Cited

U.S. PATENT DOCUMENTS 4,816,233 A      3/1989   Rourke et al.
2012/0204680 A1  8/2012   Duyvesteyn
(Continued)

FOREIGN PATENT DOCUMENTS

EP    0775753 A1    5/1997
JP    H01108118 A   4/1989
(Continued)

OTHER PUBLICATIONS

Machine translation of JP 3430973 B2, no inventor listed. Published Jul. 28, 2003. Originally published as JP 2000-313928 A on Nov. 14, 2000 by Hiromasa, Y. et al.*

(Continued)

*Primary Examiner* — George Wyszomierski
*Assistant Examiner* — Tima M McGuthry Banks
(74) *Attorney, Agent, or Firm* — Locke Lord LLP; James E. Armstrong, IV; Nicholas J. DiCeglie, Jr.

(57) ABSTRACT

The present invention effectively recover high-grade scandium from nickel oxide ores. The present invention includes a leaching step (S1) for charging nickel oxide ores and sulfuric acid into a pressurized vessel, a neutralizing step (S2) for adding a neutralizing agent to the leachate to obtain a neutralized precipitate and a neutralized liquid, a sulfidizing step (S3) for adding a sulfidizing agent to the neutralized liquid, an ion exchange step (S4) for bringing the sulfidized solution into contact with a chelate resin, a solvent extraction step (S6) for bringing a Sc eluent into contact with an extracting agent, a Sc precipitation Step (S7) for adding a neutralizing agent or oxalic acid to a stripping solution, and a calcination step (S8) for drying and calcining a precipitate to obtain scandium oxide.

11 Claims, 7 Drawing Sheets

(51) Int. Cl.
- *C22B 3/42* (2006.01)
- *C22B 23/00* (2006.01)
- *C22B 3/00* (2006.01)
- *C22B 3/26* (2006.01)
- *C22B 3/22* (2006.01)
- *C22B 3/44* (2006.01)

(56) References Cited

U.S. PATENT DOCUMENTS

2013/0074653 A1* 3/2013 Kobayashi ............ C22B 3/0005 75/330
2014/0314639 A1* 10/2014 Mihaylov ................ C22B 59/00 423/21.1

FOREIGN PATENT DOCUMENTS

| JP | H01133920 A | 5/1989 |
|---|---|---|
| JP | H03173725 A | 7/1991 |
| JP | 09194211 A * | 7/1997 |
| JP | H09176756 A | 7/1997 |
| JP | H09194211 A | 7/1997 |
| JP | H-09-291320 A | 11/1997 |
| JP | 3430973 B2 * | 7/2003 |
| WO | WO-2012014685 A1 | 2/2012 |

OTHER PUBLICATIONS

Machine translation of JP 09194211 A by Kimura et al. Published Jul. 29, 1997.*
International Search Report of PCT/JP2014/061783 dated Jul. 29, 2014.
Office Action issued in corresponding Chinese Patent Application No. CN 201480009271.1, dated Apr. 12, 2016.
Rare Earth Materials and Application Technology; ed. Lin Guanghua; ISBN: 7-5025-7076-4; 2005.
W. Wang et al. "Metallurgical processes for scandium recovery from various resources: A review," Hydrometallurgy, 108, 100-108, (2011).
Extended European Search Report, issued in corresponding European Patent Application No. EP 14794541.4, dated May 12, 2016.

* cited by examiner

FIG. 1
(FLOWCHART FOR A METHOD FOR RECOVERING SCANDIUM IN PRESENT INVENTION)

FIG. 2

RELATIONSHIP BETWEEN pH OF METAL-CONTAINING SOLUTION APPLIED TO CHELATE RESIN AND ADSORPTION AMOUNT OF METALS ON CHELATE RESIN

RELATIONSHIP BETWEEN CONCENTRATION OF HYDROCHLORIC ACID SOLUTION
USED FOR SCRUBBING TREATMENT IN SOLVENT EXTRACTION STEP
AND CONCENTRATION OF SCANDIUM IN WASHING LIQUID

FIG. 7

RELATIONSHIP BETWEEN CONCENTRATION OF SULFURIC ACID SOLUTION USED FOR SCRUBBING TREATMENT IN SOLVENT EXTRACTION STEP AND CONCENTRATION OF SCANDIUM IN WASHING LIQUID

METHOD FOR RECOVERING SCANDIUM

CROSS-REFERENCE TO RELATED APPLICATIONS

This application is the national phase under 35 U.S.C. §371 of PCT International Application No. PCT/JP2014/061783, filed Apr. 25, 2014, which claims the benefit of Japanese Application No. 2013-100217, filed May 10, 2013, the entire contents of the aforementioned applications are hereby incorporated herein by reference.

TECHNICAL FIELD

The present invention relates to a method for recovering scandium, more particularly a method for efficiently recovering scandium contained in nickel oxide minerals using a chelate resin and solvent extraction.

BACKGROUND ART

Scandium is very useful as an additive to high strength alloys and an electrode material for fuel cells. However, scandium has limited output and is expensive, and thus has not been widely used.

Incidentally, nickel oxide ores such as laterite ore and limonite ore contain a minute amount of scandium. In nickel oxide ores, however, the grade of nickel contained is low, and thus nickel oxide ores have not been industrially used as nickel raw materials for a long time. Therefore, the industrial recovery of scandium from nickel oxide ores has been hardly researched.

In recent years, however, the HPAL process is being put into practice, in which a leachate containing nickel and a leach residue are obtained by solid-liquid separation at a high temperature of about 240 to 260° C. after charging a nickel oxide ore into a pressure vessel with sulfuric acid. A neutralizer is added to the leachate obtained by this HPAL process to separate impurities, and a sulfidizing agent is then added thereto to recover nickel as nickel sulfide. The nickel sulfide is treated by an existing nickel refinement step to obtain electro nickel and nickel salt compounds.

When the HPAL process as described above is used, the scandium contained in nickel oxide ores is contained in the leachate with nickel (see Patent document 1). A neutralizer is added to the leachate obtained by the HPAL process to separate impurities, and a sulfidizing agent is then added thereto to recover nickel as nickel sulfide. On the other hand, because scandium is contained in the acid solution after adding the sulfidizing agent, nickel and scandium can be effectively separated using the HPAL process.

As a method for recovering scandium from the above acid solution, it is suggested that scandium is adsorbed on a chelate resin having an iminodiacetic acid salt as a functional group to separate impurities and is concentrated (see Patent Documents 2 to 4).

Incidentally, a method for recovering scandium from nickel oxide minerals using solvent extraction is also suggested (see Patent Document 5). In Patent Document 5, it is suggested that high purity scandium oxide is obtained by adding an organic solvent obtained by diluting 2-ethylhexyl sulfonic acid-mono-2-ethylhexyl with kerosene to an aqueous phase scandium-containing solution containing at least one or more of iron, aluminum, calcium, yttrium, manganese, chromium and magnesium along with scandium to extract scandium components into the organic solvent, then, in order to separate yttrium, iron, manganese, chromium, magnesium, aluminum and calcium extracted with scandium in the organic solvent, adding an aqueous solution of hydrochloric acid thereto for scrubbing to remove yttrium, iron, manganese, chromium, magnesium, aluminum and calcium, followed by adding an NaOH aqueous solution to the organic solvent to change scandium remaining in the organic solvent into a $Sc(OH)_3$-containing slurry, dissolving $Sc(OH)_3$ obtained by filtering this slurry in hydrochloric acid to obtain an aqueous solution of scandium chloride, adding oxalic acid to this to obtain scandium oxalate precipitates, filtering the precipitates to separate iron, manganese, chromium, magnesium, aluminum and calcium to the filtrate, and then calcining the precipitates.

Patent Document 1: Japanese Unexamined Patent Application, Publication No. H03-173725

Patent Document 2: Japanese Unexamined Patent Application, Publication No. H01-133920

Patent Document 3: Japanese Unexamined Patent Application, Publication No. H09-176756

Patent Document 4: Japanese Unexamined Patent Application, Publication No. H09-194211

Patent Document 5: Japanese Unexamined Patent Application, Publication No. H09-291320

DISCLOSURE OF THE INVENTION

Problems to be Solved by the Invention

Even if the methods described in Patent Documents 1 to 4 are used, however, nickel oxide ores also contain various impurities such as iron, aluminum and chromium along with scandium. Among these, chromium ions and iron ions in a trivalent state have strong adsorption properties on the above chelate resin, and thus once chromium ions and trivalent iron ions are adsorbed on the chelate resin, it is difficult to separate chromium and iron from the chelate resin, and then the amount of scandium adsorbed on the chelate resin decreases. Therefore, equipment efficiency declines. In addition, both scandium and impurities are adsorbed on the chelate resin, and thus when the chelate resin is reused after adsorption of impurities, there are problems in that, for example, the grade of scandium recovered declines.

In addition, when a process using solvent extraction such as Patent Document 5 is applied to the recovery of scandium from an acid solution after nickel and cobalt are recovered from a nickel oxide ore, there has been a problem in that its cost is industrially unfavorable. Scandium contained in nickel oxide minerals occurs in very minute amounts as compared to the amount of nickel, and in the slurry concentration decided from the amount of sulfuric acid required to extract nickel, the scandium concentration in the slurry is only about a few to a few tens of mg/l at the most, and a huge amount of liquid is required.

When solvent extraction is directly applied to such an acid solution, the loss accompanied by the release of an extraction agent into a target solution for extraction, i.e. an aqueous phase, is not negligible, and the cost for supplementation and the time and cost required to remove organic components such COD in drainage increase. Furthermore, the equipment investment for e.g. expanding the size of the device to treat a huge amount of liquid also increases. Among the constituents in nickel oxide ores, there are components such as iron, calcium or aluminum that easily form crud with the extraction agent used for solvent extraction, and the solvent extraction of the liquid after acid leaching of a nickel oxide mineral containing these components in large amounts has become a problem in terms of securing operative stability.

As described above, a method suitable for industrially recovering scandium from nickel oxide minerals has not been found.

An object of the present invention is to efficiently recover high-grade scandium from nickel oxide ores.

Means for Solving the Problems

As a result of repeated intensive investigation to solve the above problems, the present inventors found that scandium was separated with a chelate resin and further subjected to solvent extraction to obtain high purity scandium compounds, thereby completing the present invention. Specifically, the present invention provides as follows.

(1) The present invention is a method for recovering scandium comprising the leaching step of obtaining a leachate and leach residue by solid-liquid separation under high temperature and high pressure after charging a nickel oxide ore containing scandium, aluminum and chromium into a pressure vessel with sulfuric acid, the neutralization step of obtaining a neutralized sediment and a post-neutralization solution by adding a neutralizer to the leachate, the sulfuration step of, by adding a sulfidizing agent to the post-neutralization solution, separating the liquid into nickel sulfide and a post-sulfuration solution, the ion exchange step of obtaining a scandium eluent by bringing the post-sulfuration solution into contact with a chelate resin to adsorb the scandium on the chelate resin, the solvent extraction step of obtaining a stripping solution by bringing the scandium eluent into contact with an extraction agent, the scandium precipitation step of obtaining precipitates by adding a neutralizer or oxalic acid to the stripping solution, and the roasting step of obtaining scandium oxide by drying and roasting the precipitates.

(2) The present invention is a method for recovering scandium according to (1), wherein the chelate resin is a resin having iminodiacetic acid as a functional group, and the ion exchange step comprises the adsorption step of adsorbing the scandium on the chelate resin by bringing the post-sulfuration solution into contact with the chelate resin, the aluminum removal step of removing aluminum, which has been adsorbed on the chelate resin in the adsorption step, by bringing the chelate resin, which has adsorbed scandium in the adsorption step, into contact with 0.1 N or less sulfuric acid, the scandium elution step of obtaining the scandium eluent by bringing the chelate resin after the aluminum removal step into contact with from 0.3 N or more to less than 3 N sulfuric acid, and the chromium removal step of removing chromium, which has been adsorbed on the chelate resin in the adsorption step, by bringing the chelate resin after the scandium elution step into contact with 3 N or more sulfuric acid.

(3) The present invention is also a method for recovering scandium according to (1) or (2), wherein the extraction agent is an organic solvent having trioctylphoaphine oxide as a functional group, and the solvent extraction step comprises the extraction step of, by mixing the scandium eluent and an extraction agent, separating the eluent into a post-extraction organic solvent, which has extracted scandium, and raffinate, the scrubbing step of obtaining a post-washing organic solvent by mixing a hydrochloric acid solution with a concentration of from 2.0 mol/l or more to 9.0 mol/l or less, or a sulfuric acid solution with a concentration of from 3.5 mol/l or more to 9.0 mol/l or less with the post-extraction organic solvent to separate impurities from the post-extraction organic solvent, and the stripping step of obtaining a stripping solution by mixing a starting solution for stripping containing a hydrochloric acid solution with a concentration of less than 2.0 mol/l or a sulfuric acid solution with a concentration of less than 3.5 mol/l with the post-washing organic solvent to back-extract scandium from the post-washing organic solvent.

(4) The present invention is also a method for recovering scandium according to any of (1) to (3), wherein a neutralizer is added to the scandium eluent to adjust the pH to a range of from 2 or more to 4 or less, a reducing agent is then added thereto to adjust the oxidation-reduction potential of the scandium eluent to a range of from more than 240 mV to 300 mV or less as electric potential using a silver-silver chloride electrode as a reference electrode, and the pH is then adjusted to a range of from 1 or more to 2.5 or less by adding sulfuric acid to obtain a post-pH adjustment solution of the scandium eluent, and the ion exchange step is carried out again using this post-pH adjustment solution.

(5) The present invention is also a method for recovering scandium according to any of (1) to (4), further comprising: the oxalation step of oxalating scandium contained in the scandium eluent obtained in the ion exchange step, wherein the oxalation step comprises adjusting the pH to a range of from 8 or more to 9 or less by adding a neutralizer to the scandium eluent, obtaining a redissolved solution by adding hydrochloric acid to the sediment obtained by this adjustment, then obtaining scandium oxalate crystals by adding oxalic acid to the redissolved solution, and then dissolving the crystals in sulfuric acid and/or hydrochloric acid, wherein after the oxalation step, the crystal-dissolved solution is used for the solvent extraction step.

(6) The present invention is also a method for recovering scandium according to any of (1) to (5), wherein the scandium precipitation step is a step of adding oxalic acid to the stripping solution.

(7) The present invention is also a method for recovering scandium according to any of (1) to (5), wherein the scandium precipitation step is a step of, by adding a neutralizer to the stripping solution, adjusting the pH to a range of from 8 or more to 9 or less.

Effects of the Invention

According to the present invention, high grade scandium can be efficiently recovered from nickel oxide ores.

PREFERRED MODE FOR CARRYING OUT THE INVENTION

The specific embodiments of the present invention will now be described in detail. It should be noted, however, that the present invention is riot restricted to the following embodiments and can be carried out with proper modification within the scope of the object of the invention.

Figure 1:
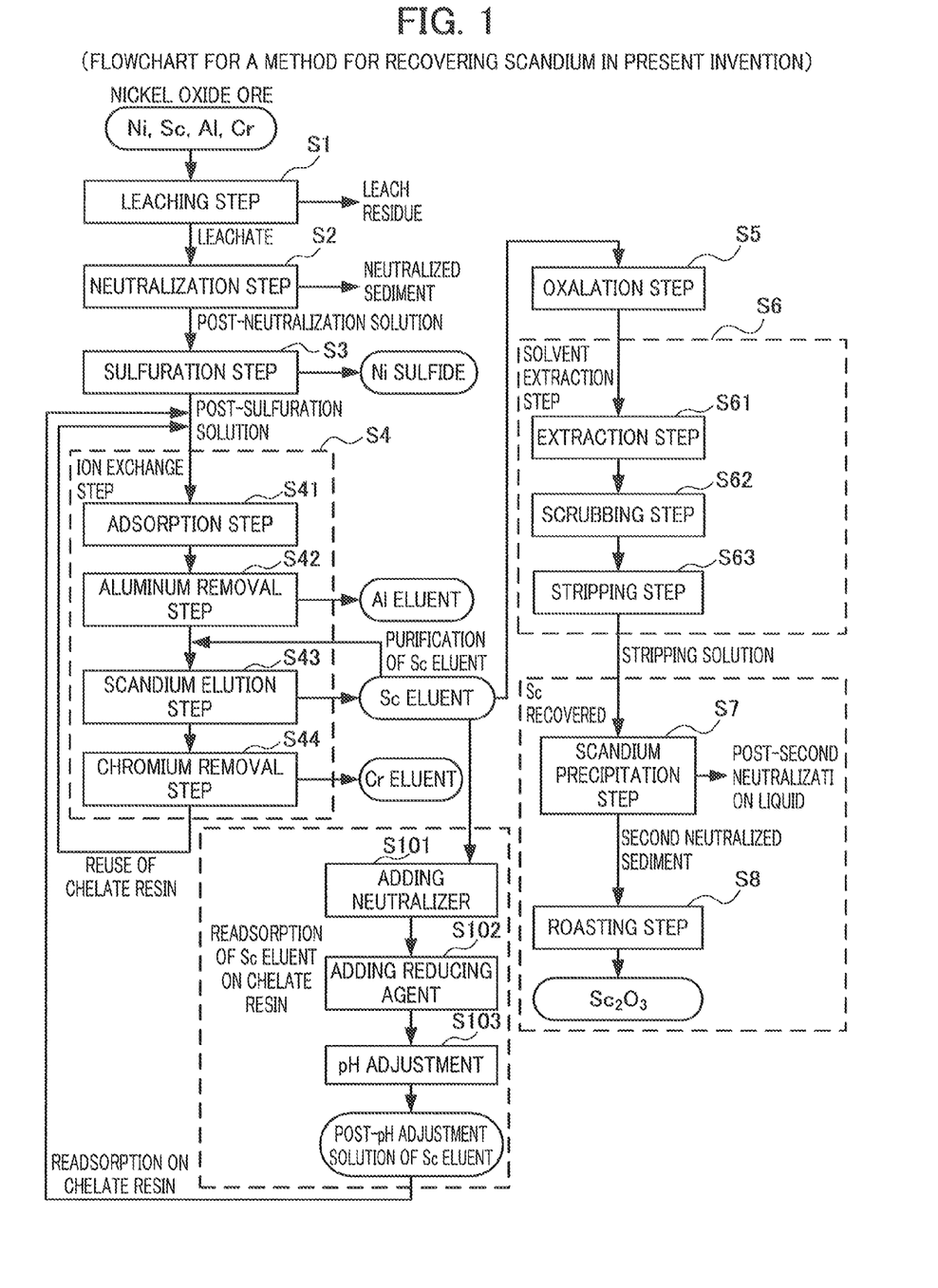
FIG. 1 is a figure illustrating the method for recovering scandium involved in the present invention.

FIG. 1 is a figure illustrating the scandium recovering method involved in the present invention. The present invention comprises the leaching step S1 of obtaining a leachate and leach residue by solid-liquid separation under high temperature and high pressure after charging a nickel oxide ore containing scandium, aluminum and chromium into a pressure vessel with sulfuric acid, the neutralization step S2 of obtaining neutralized sediment and a post-neutralization solution by adding a neutralizer to the above leachate, the sulfuration step S3 of, by adding a sulfidizing agent to the above post-neutralization solution, separating the liquid into nickel sulfide and a post-sulfuration solution, the ion exchange step S4 of obtaining a scandium eluent by bringing the above post-sulfuration solution into contact with a chelate resin to adsorb the above scandium on the above chelate resin, the solvent extraction step S6 of obtaining a stripping solution by bringing the above scandium eluent into contact with an extraction agent, the scandium precipitation step S7 of obtaining precipitates by adding a neutralizer or oxalic acid to the above stripping solution, and the roasting step S8 of obtaining scandium oxide by drying and roasting the precipitates.

The present invention is characterized by using both ion exchange and solvent extraction when scandium is recovered and purified. By using the method of the present invention, impurities can be separated at a higher grade, and stable operations can be carried out, even from raw materials containing impurities in large amounts such as nickel oxide minerals, in compact equipment.

Although, not an essential mode, the oxalation step S5 of oxalating the scandium contained in the scandium eluent obtained in the ion exchange step S4 can be carried out after the ion exchange step S4 and before the solvent extraction step S6.

Although not an essential mode, after obtaining a post-pH adjustment solution of the scandium eluent by adding a neutralizer to the scandium eluent obtained in the ion exchange step S4 (Step S101), then adding a reducing agent thereto (Step S102), and then adding sulfuric acid thereto (Step S103), the ion exchange step S4 can be carried out again using this post-pH adjustment solution. The grade of scandium recovered can be further increased by performing these steps.

Leaching Step S1

In the leaching step S1, a nickel oxide ore containing scandium, aluminum and chromium is charged into a pressure vessel with sulfuric acid, and a leachate and leach residue are obtained by solid-liquid separation under high temperature and high pressure.

The leaching step S1 can be carried out according to the HPAL process, which is previously known, and is described in e.g. Patent Document 1.

Neutralization Step S2

In the neutralization step S2, neutralized sediment and a post-neutralization solution are obtained by adding a neutralizer to the leachate obtained in the leaching step S1. Valuable metals such as scandium and nickel are contained in the post-neutralization solution, and most of the impurities including aluminum are contained in the neutralized sediment.

Conventionally known neutralizers can be used, and examples thereof include calcium carbonate, slaked lime, sodium hydroxide and the like.

In the neutralization step, the pH is preferably adjusted to a range of from 1 to 4. When the pH is loss than 1, there is a possibility that neutralization is insufficient and thus the neutralized sediment and the post-neutralization solution cannot be separated, which is not preferred. When the pH is more than 4, not only impurities including aluminum but also valuable metals such as scandium and nickel are contained in the neutralized sediment, which is not preferred.

Sulfuration Step S3

In the sulfuration step S3, sulfide and the post-sulfuration solution are separated by adding a sulfidizing agent to the post-neutralization solution. Nickel, cobalt and zinc and the like are contained in the sulfide and scandium and the like are contained in the post-sulfuration solution.

Conventionally known sulfidizing agents can be used, and examples thereof include hydrogen sulfide gas, sodium sulfide, sodium hydrogen sulfide and the like.

Ion Exchange Step S4

In the ion exchange step S4, a scandium eluent is obtained by bringing the post-sulfuration solution into contact with a chelate resin to adsorb scandium on the chelate resin. The mode of the ion exchange step S4 is not particularly limited, and the ion exchange step S4 preferably comprises the adsorption step S41 of, by bringing the post-sulfuration solution into contact with a chelate resin, adsorbing scandium on the chelate resin, the aluminum removal step S42 of removing aluminum, which has been adsorbed on the chelate resin in the adsorption step S41, by bringing the chelate resin, which has adsorbed scandium in the adsorption step S41, into contact with 0.1 N or less sulfuric acid, the scandium elution step S43 of obtaining a scandium eluent by bringing the chelate resin after the aluminum removal step S42 into contact with from 0.3 N or more to less than 3 N sulfuric acid, and the chromium removal step S44 of removing chromium, which has been adsorbed on the chelate resin in the adsorption step S41, by bringing the chelate resin after the scandium elution step S43 into contact with 3 N or more sulfuric acid.

[Adsorption Step S41]

In the adsorption step S41, scandium is adsorbed on a chelate resin by bringing the post-sulfuration solution into contact with the chelate resin.

The type of chelate resin is not particularly limited, and is preferably a resin having iminodlacetic acid as a functional group.

Incidentally, as the pH range is lower, the adsorption amount of impurities contained in nickel oxide ores is smaller. Therefore, by applying a liquid with as low a pH range as possible to a chelate resin, the adsorption of impurities on the chelate resin can be suppressed. However, when the pH is less than 2, not only the adsorption amount of impurities but also the adsorption amount of scandium decreases. Therefore, it is not preferred that a liquid with an extremely low pH region is applied to the resin for adsorption.

[Aluminum Removal Step S42]

In the aluminum removal step S42, aluminum, which has been adsorbed on the chelate resin in the adsorption step S41, is removed by bringing the chelate resin, which has adsorbed scandium in the adsorption step S41, into contact with 0.1 N or less sulfuric acid.

When aluminum is removed, the pH is maintained to preferably a range of from 1 to 2.5 and more preferably a range of from 1.5 to 2.0. When the pH is less than 1, not only aluminum but also scandium is removed from the chelate resin, which is not preferred. When the pH is more than 2.5, aluminum is not appropriately removed, from the chelate resin, which is not preferred.

[Scandium Elution Step S43]

In the scandium elution step S43, a scandium eluent is obtained by bringing the chelate resin after the aluminum removal step S42 into contact with from 0.3 N or more to less than 3 N sulfuric acid.

When obtaining the scandium eluent, the normality of sulfuric acid used for the eluent is preferably Maintained to a range of from 0.3 N or More to less than 3 N, and more preferably a range of from 0.5 N or more to less than 2 N. When the normality is 3 N or more, not only scandium but also chromium is contained in the scandium eluent, which is not preferred. When the normality is less than 0.3 N, scandium is not appropriately removed from the chelate resin, which is not preferred.

[Chromium Removal Step S44]

In the Chromium removal step S44, chromium, which has been adsorbed on the chelate resin in the adsorption step S41, is removed by bringing the chelate resin after the scandium elution Step S43 into contact with 3 N or more sulfuric acid.

In the case where chromium is removed, when the normality of sulfuric acid used for the eluent is lower than 3 chromium is not appropriately removed from the chelate resin, which is not preferred.

[Iron Removal Step]

In addition, nickel oxide ores contain iron as an impurity in some cases, which is not shown in the figure. In this case, it is preferred that before the aluminum removal step S42, sulfuric acid of lower normality than the normality of the sulfuric acid used in the aluminum removal step S42 be brought into contact with the chelate resin, which has adsorbed scandium in the adsorption step S41, to remove iron, which has been adsorbed on the chelate resin in the adsorption step S41.

When iron is removed, the pH is preferably maintained to a range of from 1 to 3, When the pH is less than 1, not only iron but also scandium is removed from the chelate resin, which is not preferred. When the pH is more than 3, iron in not appropriately removed from the chelate resin, which is not preferred.

Readsorption of Scandium Eluent on Chelate Resin

In addition, although not an essential mode, after obtaining a post-pH adjustment solution of the scandium eluent by adding a neutralizer to the scandium eluent obtained in the scandium elution step S43 to adjust the pH to a range of from 2 or more to 4 or less and preferably a range of from 2.7 to 3.3 at a midpoint of pH 3 (Step S101), then adding a reducing agent thereto (Step S102), and then adding sulfuric acid thereto to adjust the pH to a range of from 1 or more to 2.5 or less and preferably a range of from 1.7 to 2.3 at a midpoint of pH 2 (Step S103) the above adsorption step S41, the above aluminum removal step S42 and the above scandium elution step S43 are preferably carried out using this post adjustment solution again. The grade of scandium recovered can be further increased by performing these steps. The costs of chemicals and the scale of the equipment when scandium is separated from the scandium eluent can also be reduced.

It is preferred that a reducing agent be added in order to maintain the value of oxidation-reduction potential (ORP) using a silver-silver chloride electrode as a reference electrode to a range of from more than 200 mV to 300 mV or less. When the oxidation-reduction potential is 200 mV or less, sulfur components derived from the sulfidizing agent added are precipitated as minute solids, which cause the clogging of the filter cloth in the filtration step after sulfuration. Therefore, the solid-liquid separation worsens, which causes a decline in productivity, and, when applying the liquid to a chelate resin again, clogging and liquid flow imbalance occur in the resin tower, which can cause, for example, that the liquid cannot be evenly applied. On the other hand, when the oxidation-reduction potential is above 300 mV, problems can occur, for example, remaining iron ions and the like are adsorbed on the resin and thus the adsorption of scandium is inhibited.

Conventionally known neutralizers can be used, and examples thereof include calcium carbonate and the like. In addition, conventionally known reducing agents can be used, and examples thereof include sulfidizing agents such as hydrogen sulfide gas and sodium sulfide, sulfur dioxide gas, hydrazine, metal iron and the like.

When the scandium eluent is readsorbed on a chelate resin, the chelate resin which has been used already can be reused or a new chelate resin can be used, and it is preferred that the chelate resin after the chromium removal step S44 be reused or a new chelate resin be used in terms of preventing the contamination of impurities. By reusing a chelate resin after the chromium removal step S44, in particular, not only the contamination of impurities can be prevented but also the amount of chelate resin used can be reduced.

Purification of Scandium Eluent

The concentration of the scandium eluent can be raised by again carrying out the scandium elution step S43 on the scandium eluent obtained by the scandium elution step S43.

As the scandium elution step S43 is repeated more times, the concentration of the scandium recovered increases. However, when the step is repeated too many times, the degree of increase in the concentration of scandium recovered decreases Therefore, it is Preferred that the number of times the scandium elution step S43 is repeated be 8 times or less in the industrial field.

Oxalation Step S5

Although not an essential mode, in order to remove the impurities contained in the scandium eluent, the oxalation step S5 of oxalating scandium contained in the scandium eluent obtained in the scandium elution step S43 is preferably carried out after the ion exchange step S4 and before the solvent extraction step S6.

In the oxalation step S5, the pH is adjusted to a range of from 8 or more to 9 or less by adding a neutralizer (hydroxide) to the scandium eluent obtained in the scandium elution step S43 to form scandium hydroxide precipitates, and solid-liquid separation is carried out. Scandium is then redissolved by adding a hydrochloric acid solution to scandium hydroxide (sediment) as an acid solution of hydrochloric acid (redissolved liquid). Oxalic acid is then added to this acid solution of hydrochloric acid to precipitate scandium oxalate crystals, and the crystals are then dissolved in sulfuric acid and/or hydrochloric acid, and the obtained solution is subjected to the solvent extraction step S6.

The pH of oxalic acid is not particularly limited, and is preferably, for example, in a range of from 1.0 to 1.5. When the pH is too low, the amount of acids used increases, which causes a cost increase, which is not preferred. When the pH is too high, there is a possibility that the impurities contained in the redissolved liquid are precipitated and thus scandium purity decreases, which is not preferred.

By carrying out the oxalation step S5, the impurities contained in the scandium eluent can be significantly removed, and the number of steps involved in the ion exchange step S4 and the solvent extraction step S6 can be reduced. In addition, because the concentration of the starting solution subjected to solvent extraction can be optionally adjusted, there are also effects in which equipment investment is reduced due to a reduction in equipment scale for the solvent extraction step S6 and operations can be stabilized due to the stabilization of the concentration of the starting solution.

Solvent Extraction Step S6

In the solvent extraction step S6, a stripping solution is obtained by bringing the scandium eluent into contact with an extraction agent. The mode of the solvent extraction step S6 is not particularly limited, and preferably comprises the extraction step S61 of, by mixing the scandium eluent and an extraction agent, separating the eluent into a post-extraction organic solvent which has extracted scandium, and raffinate, the scrubbing step S62 of obtaining a post-washing organic solvent by mixing a hydrochloric acid solution or a sulfuric acid solution with the post-extraction organic solvent to separate the impurities from the post-extraction organic solvent, and the stripping step S63 of obtaining a stripping solution by mixing a starting solution for stripping with the post-washing organic solvent to back-extract scandium from the post-washing organic solvent. The purity of scandium contained in the scandium eluent can be further increased by carrying out the solvent extraction step S6.

[Extraction Step S61]

In the extraction step, by mixing the scandium eluent and an organic solvent containing an extraction agent, scandium is selectively extracted into the organic solvent. There are the various types of extraction agent, and solvated extraction agents containing phosphorus, specifically trioctylphosphine oxide (TOPO) are preferably used in terms of selectivity with scandium.

Various trialkylphosphine oxides with different alkyl chains occur, and any can be suitably used as trioctylphosphine oxide.

For extraction, it is preferred that TOPO be diluted with, for example, a hydrocarbon based organic solvent and used. The concentration of TOPO in the organic solvent is not particularly limited, and because its scandium extraction ability is about 1.8 g/l at a concentration of 5 v/v % and about 11.4 g/l at 40 v/v %, the concentration of TOPO in the organic solvent is preferably from 5 v/v % or more to 20 v/v % or less and particularly more preferably around 10 v/v % in view of phase separation properties for extraction and stripping and the like.

[Scrubbing (Washing) Step S62]

Although not an essential mode, when impurity elements other than scandium coexist in a solvent which has extracted scandium, the scrubbing (washing) treatment is preferably carried out on the organic solvent (organic phase) before stripping of the extraction solution to separate the impurity elements to the aqueous phase and them from the extraction agent.

A hydrochloric acid solution and a sulfuric acid solution can be used as a solution for scrubbing (washing solution). When a hydrochloric acid solution is used, the concentration range is preferably from 2.0 mol/l or more to 9.0 mol/l or less, and when a sulfuric acid solution, is used, the concentration range is preferably from 3.5 mol/l or more to 9.0 mol/l or less.

As the number of washing stages (times), when the phase ratio O/A of the organic phase (O) and the aqueous phase (A) is 1, almost all of the elements can be separated to less than the lower limits of analysis by 3 to 5 stages depending on the types and concentrations of impurity elements.

[Stripping Step S63]

In the stripping step S63, scandium is back-extracted from the organic solvent which has extracted scandium. In the stripping step S63, an inverse reaction at the time of extraction is allowed to proceed by mixing the organic solvent with water or a low concentration of acidic solution used as a stripping solution (starting solution for stripping) to obtain a post-stipping solution containing scandium.

The starting solution for stripping can be water, but there is a possibility that the phase separation from the organic phase becomes poor. Because of this, it is preferred that a low concentration of acidic solution be used as a starting solution for stripping. A hydrochloric acid solution and a sulfuric acid solution can be used as the acidic solution. The Concentration is preferably less than 2.0 mol/l for a hydrochloric acid solution and less than 3.5 mol/l for a sulfuric acid solution.

Recovery of Scandium

The scandium precipitation step S7 of obtaining precipitates by adding a neutralizer or oxalic acid to the post-stripping solution and the roasting step S8 of obtaining scandium oxide by water washing, drying and roasting of the above precipitates are carried out after the solvent extraction step S6. Scandium oxide can he recovered from nickel oxide ores by performing these step.

[Scandium Precipitation Step S7]

When a neutralizer is added to the post-stripping solution, conventionally known neutralizers can be used, and examples thereof include calcium carbonate, slaked lime, sodium hydroxide and the like. However, when the starting solution for stripping is a sulfuric acid solution and also the neutralizer is a calcium salt, gypsum is formed by neutralization. Therefore, the neutralizer is preferably sodium hydroxide.

When a neutralizer is added to the post-stripping solution, it is preferred that the pH be adjusted to a range of from 8 or more to 9 or less in the scandium precipitation step S7. When the pH is less than 8, there is a possibility that neutralization is insufficient and thus scandium cannot be sufficiently recovered, which is not preferred. When the pH is more than 9, the amount of neutralizer used increases, which causes a cost increase, which is not preferred.

By adding oxalic acid to the post-stripping solution, even higher grade scandium can be recovered than in the case where a neutralizer is added. The amount of oxalic acid added is not particularly limited, and is preferably from 1.05 times or more to 1.2 times or less of the amount of scandium contained in the post-stripping solution as a calculated amount. When the amount less than 1.05 times, there is a possibility that the whole amount of scandium contained in the post-stripping solution cannot be recovered, which is not preferred. When the amount is more than 1.2 there is a possibility of causing a cost increase, and also the amount of oxidizing agent, e,g, sodium hypochlorite, required to decompose the excess of oxalic acid increases, which is not preferred.

[Roasting Step S8]

The roasting step S8 is the step of water washing, drying and roasting the precipitates obtained in the scandium precipitation step S7. A very high grade scandium oxide can be Obtained by performing the roasting step S8.

The conditions of roasting are not particularly limited, and, for example, the precipitates are put into a tubular furnace and heated to approximately 900° C. for about 2 hours.

EXAMPLES

The present invention will now be described in more detail by way of examples. It should be noted, however, that the present invention is not restricted to these descriptions.

Preliminary Test
Relationship between the pH of Sulfuric Acid and the Adsorption Amount of Metals on Chelate Resin

TABLE 1

| | METAL | CONCENTRATION |
|---|---|---|
| COMPOSITION | SCANDIUM (Sc) | 0.3 mmol/l |
| | ALUMINUM (Al) | 0.1 mol/l |
| | CHROMIUM (Cr) | 0.01 mol/l |
| | IRON (Fe) | 0.03 mol/l |

To examine the relationship between the pH of sulfuric acid and the adsorption amount of metals on a chelate resin, the special grade reagents of metals described in Table 1 were dissolved in from 0.1 to a 3 N sulfurs acid, and the solution was applied to a column filled with a chelate resin having iminodiacetic acid as a functional group (Product name: DIAION CR11, manufactured by Mitsubishi Chemical Corporation). The amount of resin was 4 ml, and the solution was applied at a flow rate of 0.53 ml per minute so that SV was 8, and was applied until reaching 240 ml Volume: BV=60). The metals were 4 types, scandium (Sc), aluminum (Al), chromium (Cr) and iron (Fe), and the concentrations of the metals in the solution were 0.3 mmol/L, 0.1 mol/L, 0.01 mol/L and 0.03 mol/L, respectively. In addition, the solution after being dissolved in concentrated sulfuric acid was adjusted to 6 types of pH, 0.5, 1.0, 1.5, 2.0, 3.0, 4.0, by adding slaked lime and applied to the above column. The temperature of the solution was 60° C.

Figure 2:
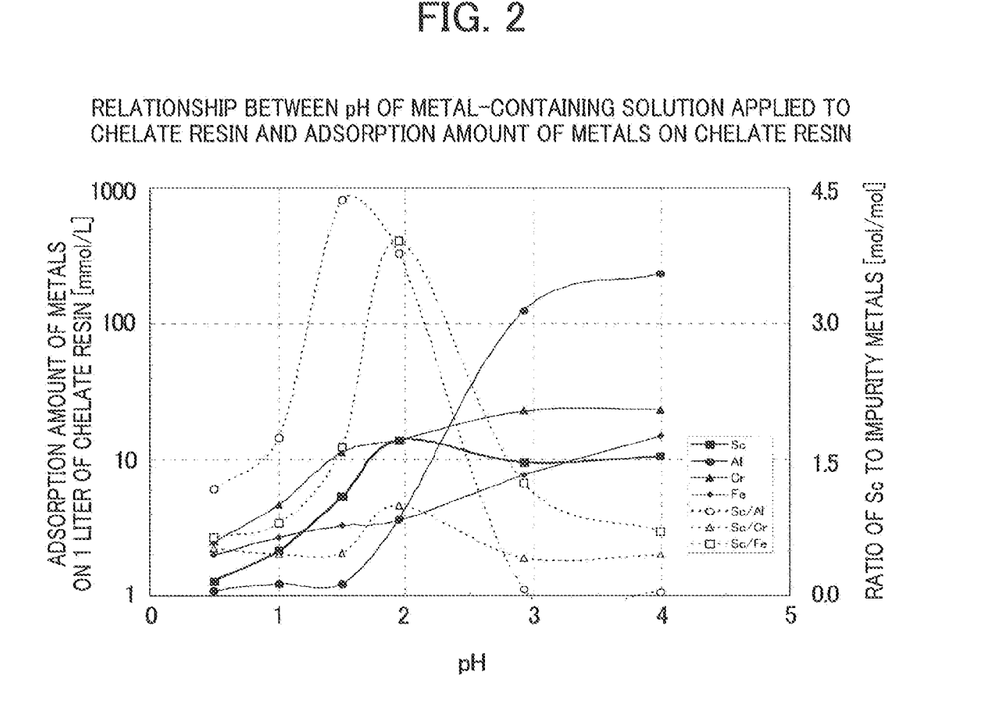
FIG. 2 is a figure showing the relationship between the pH of a metal-containing solution applied to a chelate resin and the adsorption amount of the metals on the chelate resin.

The amount attached to the chelate resin at this time was calculated by measuring the amount of eluent and the concentrations of metals contained in the eluent. The results are shown in FIG. 2. In FIG. 2, the abscissa indicates the pH of the metal-containing solution applied, and the ordinate (left) indicates the adsorption amount of metals on 1 liter of chelate resin (unit: mmol/L). In addition, in FIG. 2, the ordinate (right) indicates the ratio of the adsorption amount of scandium to the adsorption amount of impurities. For example, Sc/Al indicates the ratio of the adsorption amount of scandium to the adsorption amount of aluminum, Sc/Cr indicates the ratio of the adsorption amount of scandium to the adsorption amount of chromium, and Sc/Fe indicates the ratio of the adsorption amount of scandium to the adsorption amount of iron.

According to FIG. 2, it turns out that the pH suitable for adsorption on a chelate resin varies depending on the types of metal. It turns out that, for example, when the metal is iron, it is easily adsorbed on the chelate resin at a relatively high pH, when the metal is aluminum, it is easily adsorbed on the chelate resin at the next highest pH after when the metal is iron, when the metal is scandium, it is easily adsorbed on the chelate resin at the next highest pH after when the metal is aluminum, and when the metal is chromium, it is easily adsorbed on the chelate resin at the lowest pH.

From this, it is assumed that by applying sulfuric acid solutions with different pH to a chelate resin in stages after the adsorption step S41, impurities can be appropriately removed from the chelate resin and scandium can be efficiently recovered.

Example 1

Removal Chromium Adsorbed on Chelate Resin
[Leaching Step S1]
First, a nickel oxide ore was charged into an autoclave with concentrated sulfuric acid, and a slurry containing valuable metals such as scandium and nickel was formed under conditions of 245° C. over an hour, and a leachate containing the above valuable metals and leach residue were obtained by solid-liquid separation from this slurry.

[Neutralization Step S2]
Neutralized sediment and a post-neutralization solution were then obtained by adding calcium carbonate to this leachate to adjust the to a range of from 1 to 4. Valuable metals such as scandium and nickel are contained in the post-neutralization solution and most of the impurities including aluminum are contained in the neutralized sediment.

[Sulfuration Step S3]
Next, hydrogen sulfide gas was blown into the post-neutralization solution to separate nickel, cobalt and zinc as Sulfides from a post-sulfuration solution.

[Ion Exchange Step S4]
[Adsorption Step S41]
Slanked lime was added to this post-sulfuration solution as a neutralizer to adjust the pH to 1.6. The composition of this adsorbed liquid was Ni: 0.036 g/l Mg: 6.5 g/l, Mn: 2.8 g/l, Fe: 1 g/l, Al: 2.3 g/l, Cr: 0.037 g/l and Sc: 0.014 g/l. Next, this adsorbed liquid was applied to a column filled with the CR11 type chelate resin as described above. The amount of resin was 4 ml, and the liquid was applied at a flow rate of 0.53 ml per minute so that SV was 8, and was applied until reaching 240 ml (Bed Volume: BV=60). The temperature of the liquid was 60° C.

[Aluminum Removal Step S42]
Next, 80 ml of sulfuric acid solution with a concentration of 0.1 N was applied to this chelate resin at a flow rate of 2.7 ml per minute (SV is 40). The residual washing liquid discharged from the column, containing aluminum in a large amount, was stored as an aluminum washing liquid, and a portion thereof was taken as a sample and analyzed by ICP.

The analysis values were Ni: 7 mg/l, Mg: 1 mg/l, Mn: 4 mg/l, Fe: 1 mg/l, Al: 84 mg/l and Sc: 3 mg/l. Cr and Ca had values equal to or lower than their lower limits.

[Scandium Elution Step S43]
After that, 40 ml of sulfuric acid solution with a concentration of 1 N was applied to the chelate resin at a flow rate of 8 ml per minute (SV is 40). The eluent discharged from the column was stored as a scandium eluent, and taken as a sample and analyzed.

The analysis values were Ni: 5 mg/l, Fe: 126 mg/l, Al: 4 mg/l, Cr: 10 mg/l and Sc: 43 mg/l. Mn and Ca had values equal to or lower than their lower limits. With simple calculation, the grade of scandium is 67%.

[Chromium Removal Step S44]
Ultimately, 80 ml of sulfuric acid solution with a concentration of 3 N was applied to the chelate resin at a flow rate of 2.6 ml per minute (SV is 40). The washing liquid discharged from the column was stored as a chromium washing liquid, and taken as a sample and analyzed.

The analysis values were Fe: 2 mg/l and Cr: 30 mg/l. Ni, Mg, Mn, Al, Ca and Sc had values equal to or lower than their lower limits.

[Reuse of Chelate Resin After Chromium Removal Step S44]
The chelate resin after washing chromium was washed by flowing 40 ml of water at a flow rate of 2.6 ml per minute, and was repeatedly used for the above adsorption treatment S41 several times. The results confirmed that even when a chelate resin was repeatedly used for the above adsorption treatment S4, high grade scandium could be recovered, which was almost equal to the case when the resin is replaced with a new chelate resin.

[Solvent Extraction Step S6]

[Extraction Step S61]p The scandium eluent, 103 liters, obtained in the above ion exchange step, and 2.6 liters of organic solvent, in which trioctylphosphine oxide (TOP) (manufactured by HOKKO CHEMICAL INDUSTRY CO., LTD.) was dissolved with a solvent, ShellSole A (manufactured by Shell Chemicals Japan Ltd.), to a concentration of 13 v/v %, were mixed and stirred for 60 minutes to obtain an extract organic phase containing scandium. The concentration of scandium in the extraction raffinate was less than 0.1 mg/l and the extraction rate was 99.8% or more.

In addition, crud was not formed at the time of extraction, and phase separation after standing quickly proceeded.

[Scrubbing (Washing) Step S62]

Next, 2.6 liters, by which the phase ratio (O/A) is 1, of hydrochloric acid solution with a concentration of 6.5 mol/l was mixed with 2.6 liters of organic solvent containing scandium (extract organic phase) obtained in the extraction step, and the obtained mixture was stirred for 10 minutes for washing. After this, the aqueous phase was separated by standing, and the organic phase was mixed with 2.6 liters of new hydrochloric acid solution with a concentration of 6.5 mol/l again for washing, and the aqueous phase was separated in the same manner. Such washing operation was repeated three times in total.

Figure 4:
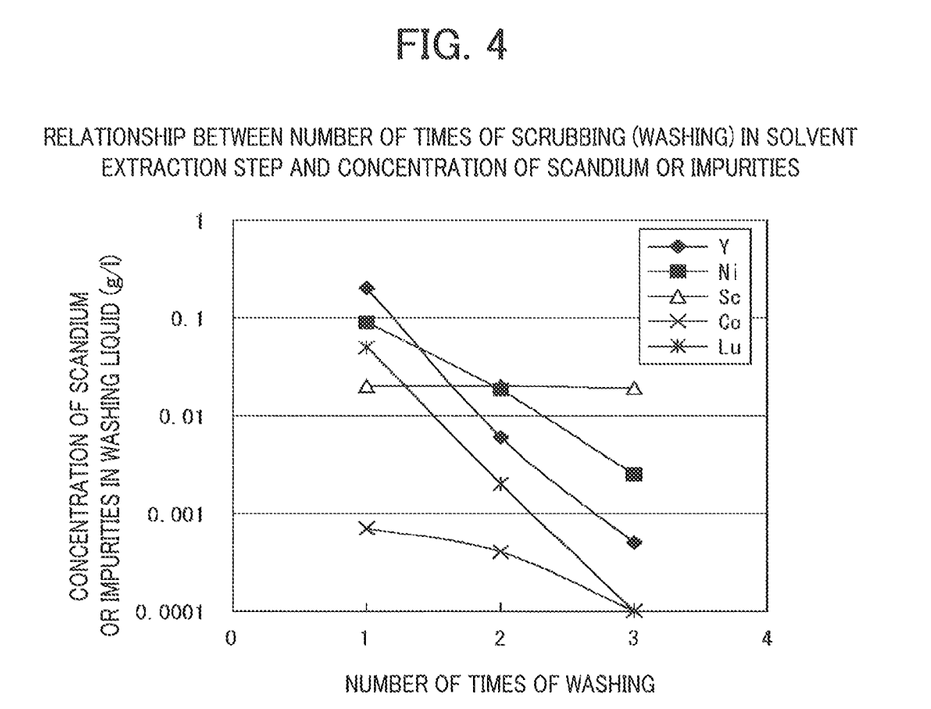
FIG. 4 is a figure showing the relationship between the number of washing times in the scrubbing (washing) step in the solvent extraction step and the concentration of scandium or impurities in the washing liquid.

FIG. 4 shows the relationship between the number of times of washing for the organic solvent and the concentrations of metal ions in the washing liquid. As shown in FIG. 4, impurity metals eluted could be removed to a concentration of 0.001 g/l or less by washing the extract organic phase three times. On the other hand, it turned out that the loss of scandium remained at a digit of 0.01 g/l, and only impurities could be effectively removed to the aqueous phase without separating scandium extracted in the organic solvent.

[Stripping Step S63]

Next, a hydrochloric acid solution with a concentration of 1% (about 0.3 mol/l) was mixed with the extract organic phase after washing so that the phase ratio O/A=1/1 was obtained, and the obtained solution was stirred for 20 minutes to back-extract scandium into the aqueous phase. After this, the aqueous phase was separated by standing, and a new hydrochloric acid solution with a concentration of 1% was mixed with the organic phase again in the same manner, and the aqueous phase was separated. Such stripping operation was repeated three times.

Figure 5:
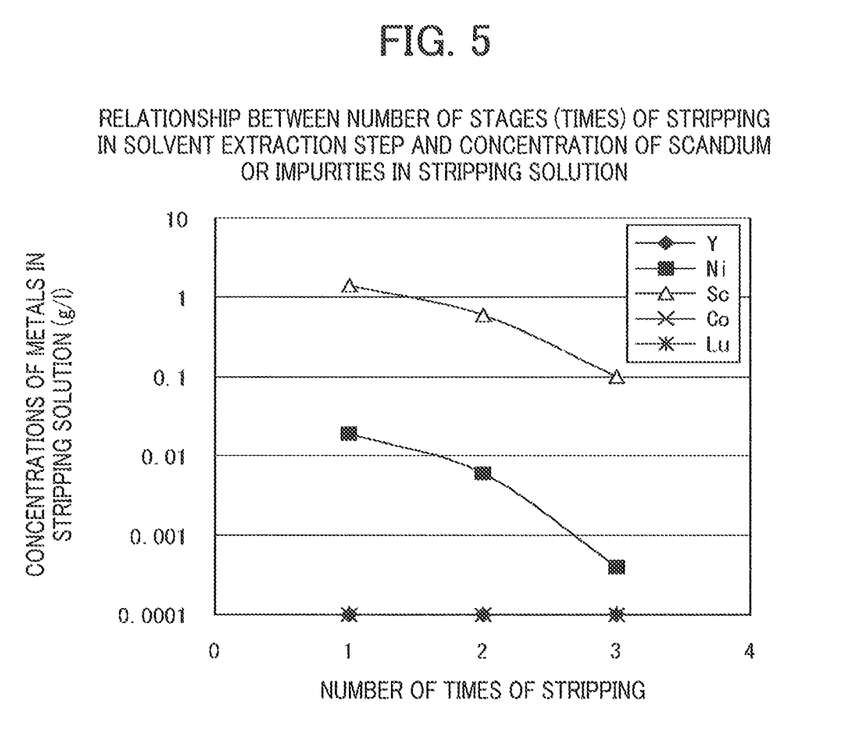
FIG. 5 is a figure showing the relationship between the number of times of stripping in the solvent extraction step and the concentrations of metal elements in the stripping solution.
Figure 6:
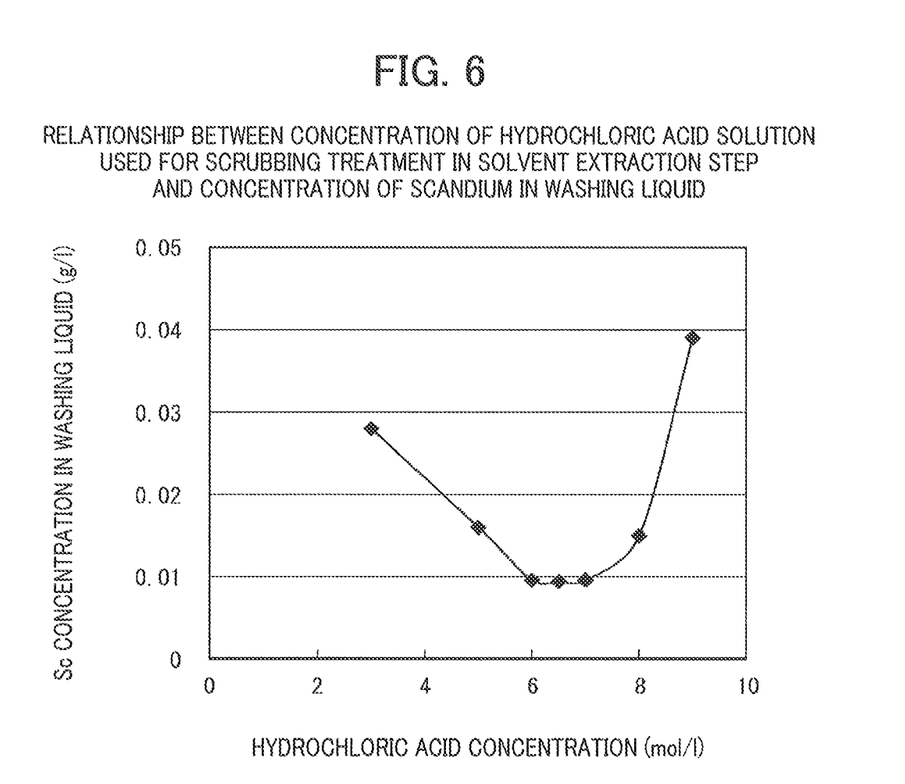
FIG. 6 is a figure showing the relationship between the concentration of the hydrochloric acid solution (washing liquid) used for the scrubbing (washing) treatment in the solvent extraction step and the concentration of scandium in the washing liquid.
Figure 7:
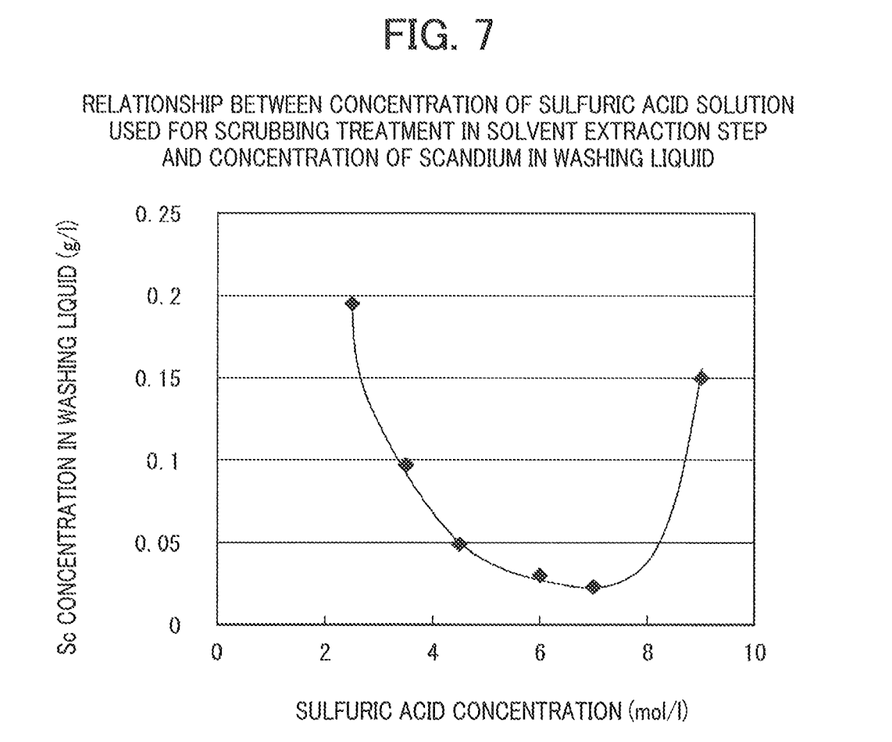
FIG. 7 is a figure shoving the relationship between the concentration of the sulfuric acid solution (washing liquid) used for the washing treatment in the solvent extraction step and the concentration of scandium in the washing liquid.

FIG. 5 shows the relationship between the number of times of stripping operation and the concentrations of metal ions in the aqueous phase in the stripping solution. The total amount of scandium in the liquids after stripping three times (post-stripping solution) was 9.3.3% of the amount contained in the original liquid and almost all could be extracted. In addition, from FIG. 5, all impurity elements except nickel could be reduced to less than 0.1 mg/l.

[Scandium Precipitation Step S7]

The post-stripping solutions obtained in the above solvent extraction step S6 were combined, and sodium hydroxide was added to this liquid to maintain the pH between 8 and 9, and scandium hydroxide precipitates were formed. This sediment was subjected to solid-liquid separation, and then washed with water. The obtained precipitates were identified by an X-ray diffractometer, and were confirmed to have a scandium hydroxide ($Sc(OH)_3$) form.

[Roasting Step S8]

In a high purity magnesia boat, 100 g of scandium hydroxide obtained in the above scandium precipitation step was transferred, and the boat was put into a quartz tubular furnace. The temperature was increased to 850° C. with air blown at a flow rate of 2 liters per minute, and heating was continued for 2 hours after the temperature increase. Scandium hydroxide was roasted to obtain a roasted substance After this, the obtained roasted substance was cooled to room temperature and taken out, and the form and grade of impurities were analyzed by X-ray diffraction and emission spectrochemical analysis.

Consequently, the form of the obtained roasted substance was $Sc_2 O_3$, and all major impurities were removed to less than 1 ppm. The elements detected by emission spectrochemical analysis were iron (Fe) with 4 ppm, and calcium (Ca), magnesium (Mg), antimony (Sb) and silicon (Si) with less than 1 ppm, and high quality scandium oxide, above 99.99%, was obtained.

Comparative Example

Each step was carried out in the same conditions as in Example 1 except that the chromium removal step S44 was not carried out. The chelate resin was reused under the same conditions as in Example 1. However, chromium was not sufficiently eluted from the chelate resin, and thus the adsorption amount of scandium on the chelate resin declined as compared to that in Example 1, and the grade of recovered scandium declined as compared to that in Example 1.

Example 2

Readsorption of Scandium Eluent Obtained in Scandium Elution Step S43

The scandium eluent obtained in Example 1 was adjusted to pH 3, and a reducing agent was then added thereto so that the value of oxidation-reduction potential using a silver-silver chloride electrode as a reference electrode was −200 mV or less, and the pH was then adjusted with sulfuric acid to a range of from 1 to 2.5.

Next, the scandium eluent was applied to 4 ml of chelate resin, which was the same type as in the above. Example under the same liquid application conditions as in Example 1, and then washed and eluted with the same sulfuric acid solutions as in Example 1 with a concentration of 0.1 N, 1 N or 3 N to obtain a readsorbed aluminum washing liquid, a readsorbed scandium eluent and a readsorbed chromium eluent.

The composition of the readsorbed aluminum washing liquid was Al: 3 mg/l and Sc: 0.24. g/l, and all the above-described elements other than these had values equal to or lower than their lower limits.

The composition of the readsorbed scandium eluent was Fe: 1 mg/l and Sc: 0.4 g/l, and the other elements had values of their lower limits. The grade of scandium obtained was 99.8%.

The composition of the readsorbed chromium was Fe and Sc: 1 mq/l and all the other elements had values equal to or lower than their lower limits.

The grade of scandium was confirmed to be increased by readsorption.

Example 3

Purification of Scandium Eluent

The scandium elution step S43 was repeated several times to purify the scandium eluent. That is, the scandium elution step S43 was carried out to the scandium eluent obtained by the scandium elution step S43 again to increase the concentration of scandium, and the composition, of the scandium eluent was measured again.

Figure 3:
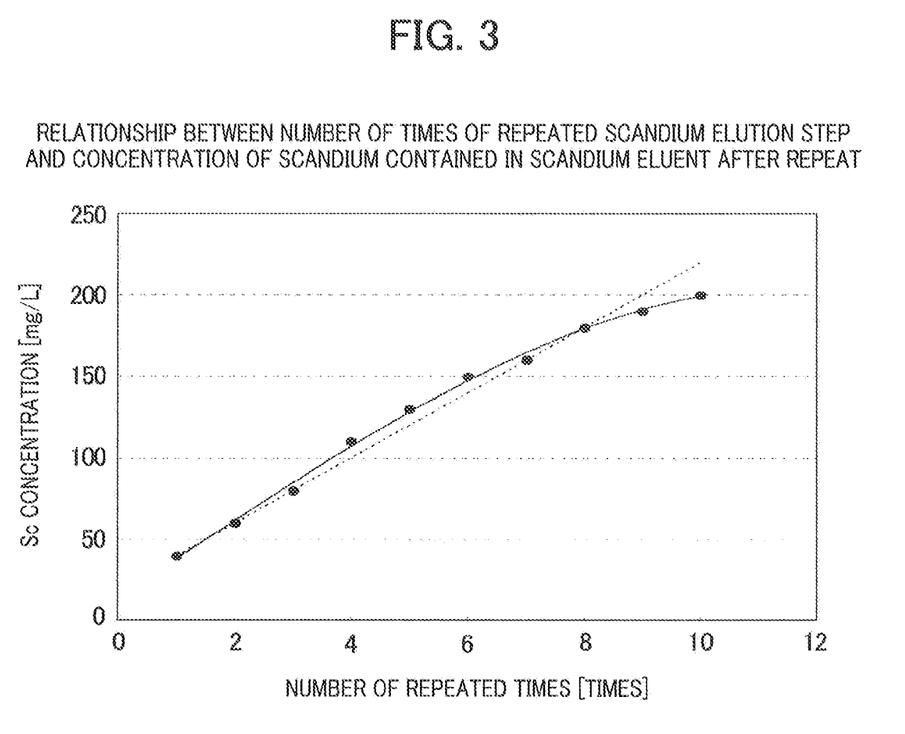
FIG. 3 is a figure showing the relationship between the number of times the scandium elution step is repeated and the concentration of scandium contained in the scandium eluent after the step is repeated.

The results obtained by this are shown in FIG. 3. In FIG. 3, the abscissa indicates the number of times the scandium elution stop S43 was repeated, and the ordinate indicates the concentration of scandium contained in the scandium eluent after the step was repeated. In FIG. 3, the dotted is an approximate straight line by the method of least squares. According to FIG. 3, as the scandium elution step S43 is repeated more times, the concentration of scandium recovered increases. However, when the step was repeated too many times, the degree of increase in the concentration of scandium recovered decreased. Therefore, it turns out that the number of times the scandium elution step S43 is repeated is preferably 8 times or less in the industrial field.

Example 4

The Case where Oxalic Acid is added to the Stripping Solution in Scandium Precipitation Step S7

The treatment was carried out under the same conditions as in Example 1 described above, and oxalic acid dihydrate (manoaotured by MITSUBISHI GAS CHEMICAL COMPANY, INC.) crystals, twice the amount of scandium contained in the post-stripping solution as a calculated amount, were dissolved in the post-stripping solution obtained in the solvent extraction step S6, and the obtained solution was stirred and mixed for 60 minutes to form white crystal precipitates of scandium oxalate. The formed white crystal precipitates were filtered. With suction, washed with pure water and dried at 105° C. for 8 hours.

Next, the dried oxalic acid salt was roasted using the same method as in Example 1 and analyzed by emission spectrochemical analysis. Consequently, iron could be also reduced to 1 ppm or less. In addition, good separation properties of chromium and sulfur were shown, and further the effects on the separation of phosphorus, sulfur, selenium, uranium and samarium were also observed.

The invention claimed is:

1. A method for recovering scandium, comprising:
a leaching step of obtaining a leachate and leach residue by solid-liquid separation under high temperature and high pressure after charging a nickel oxide ore containing scandium, aluminum and chromium into a pressure vessel with sulfuric acid,
a neutralization step of obtaining neutralized sediment and a post-neutralization solution by adding a neutralizer to the leachate,
a sulfuration step of obtaining nickel sulfide and a post-sulfuration solution by adding a sulfidizing agent to the post-neutralization solution, and separating the nickel sulfide and the post-sulfuration solution,
an ion exchange step of obtaining a scandium eluent by bringing the post-sulfuration solution into contact with a chelate resin to adsorb the scandium on the chelate resin,
a solvent extraction step of obtaining a stripping liquid by bringing the scandium eluent into contact with an extraction agent,
a scandium precipitation step of obtaining precipitates by adding a neutralizer or oxalic acid to the stripping liquid, and
a roasting step of obtaining scandium oxide by drying and roasting the precipitates;
wherein the chelate resin is a resin having iminodiacetic acid as a functional group, and
wherein the ion exchange step comprises:
an adsorption step of adsorbing the scandium on the chelate resin by bringing the post-sulfuration solution into contact with the chelate resin,
an aluminum removal step of removing aluminum, which has been adsorbed on the chelate resin in the adsorption step, by bringing the chelate resin, which has adsorbed scandium in the adsorption step, into contact with 0.1 N or less sulfuric acid,
a scandium elution step of obtaining the scandium eluent by bringing the chelate resin after the aluminum removal step into contact with from 0.3 N or more to less than 3 N sulfuric acid, and
a chromium removal step of removing chromium, which has been adsorbed on the chelate resin in the adsorption step, by bringing the chelate resin after the scandium elution step into contact with 3 N or more sulfuric acid.

2. The method for recovering scandium according to claim 1,
wherein a neutralizer is added to the scandium eluent to adjust the pH to a range of from 2 or more to 4 or less,
a reducing agent is then added thereto to adjust an oxidation-reduction potential of the scandium eluent to a range of from more than 200 mV to 300 mV or less as electric potential using a silver-silver chloride electrode as a reference electrode, and
the pH is then adjusted to a range of from 1 or more to 2.5 or less by adding sulfuric acid to obtain a post-pH adjustment solution of the scandium eluent, and
the ion exchange step is carried out again using this post-pH adjustment solution.

3. The method for recovering scandium according to claim 1, wherein the scandium precipitation step is a step of adding oxalic acid to the stripping solution.

4. The method for recovering scandium according to claim 1, wherein the scandium precipitation step is a step of, by adding a neutralizer to the stripping solution, adjusting the pH to a range of from 8 or more to 9 or less.

5. A method for recovering scandium comprising:
a leaching step of obtaining a leachate and leach residue by solid-liquid separation under high temperature and high pressure after charging a nickel oxide ore containing scandium, aluminum and chromium into a pressure vessel with sulfuric acid,
a neutralization step of obtaining neutralized sediment and a post-neutralization solution by adding a neutralizer to the leachate,
a sulfuration step of obtaining nickel sulfide and a post-sulfuration solution by adding a sulfidizing agent to the post-neutralization solution, and separating the nickel sulfide and the post-sulfuration solution,
an ion exchange step of obtaining a scandium eluent by bringing the post-sulfuration solution into contact with a chelate resin to adsorb the scandium on the chelate resin,
a solvent extraction step of obtaining a stripping liquid by bringing the scandium eluent into contact with an extraction agent,
a scandium precipitation step of obtaining precipitates by adding a neutralizer or oxalic acid to the stripping liquid, and
a roasting step of obtaining scandium oxide by drying and roasting the precipitates;
wherein the extraction agent is an organic solvent having trioctylphosphine oxide as a functional group, and
the solvent extraction step comprises:
an extraction step of, by mixing the scandium eluent and the extraction agent, separating the eluent into a post-extraction organic solvent which has extracted scandium, and raffinate,
a scrubbing step of obtaining a post-washing organic solvent by mixing a hydrochloric acid solution with a concentration of from 2.0 mol/l or more to 9.0 mol/l or less, or a sulfuric acid solution with a concentration of from 3.5 mol/l or more to 9.0 mol/l or less with the post-extraction organic solvent to separate impurities from the post-extraction organic solvent, and a stripping step of obtaining a stripping liquid by mixing a starting solution for stripping containing a hydrochloric acid solution with a concentration of less than 2.0 mol/l or a sulfuric acid solution with a concentration of less than 3.5 mol/l with the post-washing organic solvent to back-extract scandium from the post-washing organic solvent.

6. The method for recovering scandium according to claim 5, wherein a neutralizer is added to the scandium eluent to adjust the pH to a range of from 2 or more to 4 or less, a reducing agent is then added thereto to adjust an oxidation-reduction potential of the scandium eluent to a range of from more than 200 mV to 300 mV or less as electric potential using a silver-silver chloride electrode as a reference electrode, and the pH is then adjusted to a range of from 1 or more to 2.5 or less by adding sulfuric acid to obtain a post-pH adjustment solution of the scandium eluent, and the ion exchange step is carried out again using this post-pH adjustment solution.

7. The method for recovering scandium according to claim 5, wherein the scandium precipitation step is a step of adding oxalic acid to the stripping solution.

8. The method for recovering scandium according to claim 5, wherein the scandium precipitation step is a step of, by adding a neutralizer to the stripping solution, adjusting the pH to a range of from 8 or more to 9 or less.

9. A method for recovering scandium, comprising:

a leaching step of obtaining a leachate and leach residue by solid-liquid separation under high temperature and high pressure after charging a nickel oxide ore containing scandium, aluminum and chromium into a pressure vessel with sulfuric acid, a neutralization step of obtaining neutralized sediment and a post-neutralization solution by adding a neutralizer to the leachate, a sulfuration step of obtaining nickel sulfide and a post-sulfuration solution by adding a sulfidizing agent to the post-neutralization solution, and separating the nickel sulfide and the post-sulfuration solution, an ion exchange step of obtaining a scandium eluent by bringing the post-sulfuration solution into contact with a chelate resin to adsorb the scandium on the chelate resin, a solvent extraction step of obtaining a stripping liquid by bringing the scandium eluent into contact with an extraction agent, a scandium precipitation step of obtaining precipitates by adding a neutralizer or oxalic acid to the stripping liquid, and a roasting step of obtaining scandium oxide by drying and roasting the precipitates; and further comprising a oxalation step of oxalating scandium contained in the scandium eluent obtained in the ion exchange step, wherein the oxalation step comprises:

adjusting pH to a range of from 8 or more to 9 or less by adding a neutralizer to the scandium eluent, obtaining a redissolved liquid by adding hydrochloric acid to a sediment obtained by this adjustment, then obtaining scandium oxalate crystals by adding oxalic acid to the redissolved liquid, and then dissolving the crystals in sulfuric acid and/or hydrochloric acid, wherein after the oxalation step, the crystal-dissolved solution is used for the solvent extraction step.

10. The method for recovering scandium according to claim 9, wherein the scandium precipitation step is a step of adding oxalic acid to the stripping solution.

11. The method for recovering scandium according to claim 9, wherein the scandium precipitation step is a step of, by adding a neutralizer to the stripping solution, adjusting the pH to a range of from 8 or more to 9 or less.

* * * * *